United States Patent [19]

Lamb et al.

[11] Patent Number: 4,608,276
[45] Date of Patent: Aug. 26, 1986

[54] MANUFACTURING OPTICAL FIBRE

[75] Inventors: John G. Lamb; Terence M. McHugh, both of Harlow, England

[73] Assignee: Standard Telephones and Cables Public Limited Company, London, England

[21] Appl. No.: 736,327

[22] Filed: May 21, 1985

[30] Foreign Application Priority Data

Jun. 1, 1984 [GB] United Kingdom ................. 8414054

[51] Int. Cl.[4] .......................... C03C 25/02; B05D 5/06
[52] U.S. Cl. ...................................... 427/163; 65/3.11
[58] Field of Search ........................... 427/163; 65/3.11

[56] References Cited

U.S. PATENT DOCUMENTS 4,518,628 5/1985 Biswas et al. .................... 427/163 X
4,526,599 7/1985 Barns et al. ...................... 427/163 X Primary Examiner—James R. Hoffman
Attorney, Agent, or Firm—Kerkam, Stowell, Kondracki & Clarke

[57] ABSTRACT

On line coating of optical fibre (20) adopts silicon nitride or oxynitride to provide an hermetic seal using chemical vapor deposition. Non-contacting gas seals (3,4) at the top and bottom of the reaction chamber are so constructed that fibre vibration is avoided, (6) surface flaws are minimized and the coating minimizes stress corrosion.

6 Claims, 2 Drawing Figures

MANUFACTURING OPTICAL FIBRE

FIELD OF THE INVENTION

This invention relates to on-line coating of optical fibres.

BACKGROUND OF THE INVENTION

Freshly drawn optical fibre in the pristine state, free from surface defects, is capable of exhibiting strengths in excess of $10^6$ psi. However, this must be regarded as ultimate strength rather than that routinely attainable over long lengths. A major difficulty in achieving very high strength fibres has been the inability to rigorously limit the size or completly eliminate the presence of surface flaws on the fibre. Surface flaws may originate from a number of sources. They may exist prior to and persist after drawing as is the case of residual contaminants and defects from the support tube used for the preform preparation. Damage may also be induced in the surface of the preform during processing and handling. Other sources include the presence of devitrification at the surface of the preform and contact with any foreign substance during and after drawing, including particulate debris and condensates from furnace refactories, heating elements and dust particles in the drawing environment. Misalignment of coating applicators and foreign particles in coating materials are also potential sources of weak fibre.

In order to keep the fibre surface as defect free as possible it is essential to apply a protective coating on-line. However, pre-existing flaws on the fibre surface act as stress concentrators and, in the presence of moisture, these flaws slowly grow in size until the local stress concentration is sufficiently high that catastrophic growth begins and results in fibre fracture. Thus, the fibre breaks at service stresses far below the initial fibre strength. This process of strength degradation with time as a result of crack enlargement by the combined action of stress and moisture is known as Stress Corrosion or Static Fatigue. Therefore, in order to guarantee a certain lifetime for a fibre one must proof test at a level much higher than it would be expected to see in service and thus allow for strength degradation by stress corrosion. Alternatively, one prevents or drastically reduces stress corrosion such that proof test strains can be comparable with those actually expected during service i.e. the strength of the fibre will remain constant with time.

For stress corrosion to occur two conditions must prevail:
(i) stress at a surface flaw and
(ii) moisture must be available at this flaw.

Under these conditions nucleophilic attack by water can cause disruption of Si—O—Si linkages. In order to prevent the occurrence of stress corrosion one must simply remove one or both of the requirements indicated above. Installed fibres are normally under a small but significant stress. This, coupled with higher stresses experienced during installation or recovery of a cable, means that it is not feasible for the fibre to experience zero stress during all or most of its projected lifetime (25 years for underwater telecommunications systems). Consequently, the only retaining means of inhibiting stress corrosion is to prevent moisture reaching the fibre surface. While organic coatings, either thermally or UV cured, provide excellent abrasion resistance, ambient moisture will quickly penetrate the coating hence allowing stress corrosion to proceed.

For example thermally cured silicones are easy to apply and cure but provide a poor water barrier and present curing problems at high pulling speed. Ultraviolet cured polymers are also easy to apply and they cure rapidly, but still do not provide a satisfactory water barrier.

Hermetic coatings can be obtained by metallization, freeze coating from melt-amorphous metals and by ceramic coatings such as silicon nitride or silicon oxynitride. Metallization coatings have been shown to weaken the fibre although they provide a very effective water barrier; freeze coating from melt-amorphous metals also provides a very effective water barrier and is elastic to about two percent strain, but need very high quench ratios for high speed pulling; ceramic coatings are highly adherent and provide a very effective water barrier but can involve the use of toxic materials and elevated diposition temperatures, making them very difficult to handle for on line coatings.

OBJECT OF THE INVENTION

It is an object of the present invention to enable an optical fibre to be hermetically coated while minimising as far as possible the occurrence of surface flaws.

SUMMARY OF THE INVENTION

According to the present invention there is provided a method of manufacturing an optical fibre comprising drawing the fibre through an on-line process chamber to physically and/or chemically change the surface of the fibre with the chamber, and sealing the atmosphere within the chamber at least at one end of the chamber by a seal into which a sealing gas is introduced and so controlled as to prevent the process gases escaping from the chamber without the fibre touching the walls of the seal and without vibrating the fibre.

According to another aspect of the present invention there is provided apparatus for manufacturing an optical fibre comprising a process chamber through which the fibre can be drawn, an inlet for introducing reaction gases into the process chamber, and a seal for sealing between the fibre and the entrance to or exit from the chamber, the seal comprising means for introducing a sealing gas into the seal and means for so controlling the gas as to prevent the process gases escaping from the chamber without the fibre touching the walls of the seal and without vibrating the fibre.

According to a further aspect of the invention there is provided a non-contacting seal for the entrance or exit of an on-line fibre processing chamber, said seal comprising a structure having a processing through-hole for the fibre, a first gas jet directed in one axial direction along the hole, and a second gas jet directed in the opposite said direction along the hole and away from the first jet to provide a dead sealing zone between the jets without vibrating the fibre.

BRIEF DESCRIPTION OF THE DRAWINGS

In order that the invention can be clearly understood reference will now be made to the accompanying drawings in which.

DESCRIPTION OF THE PREFERRED EMBODIMENT

Figure 1:
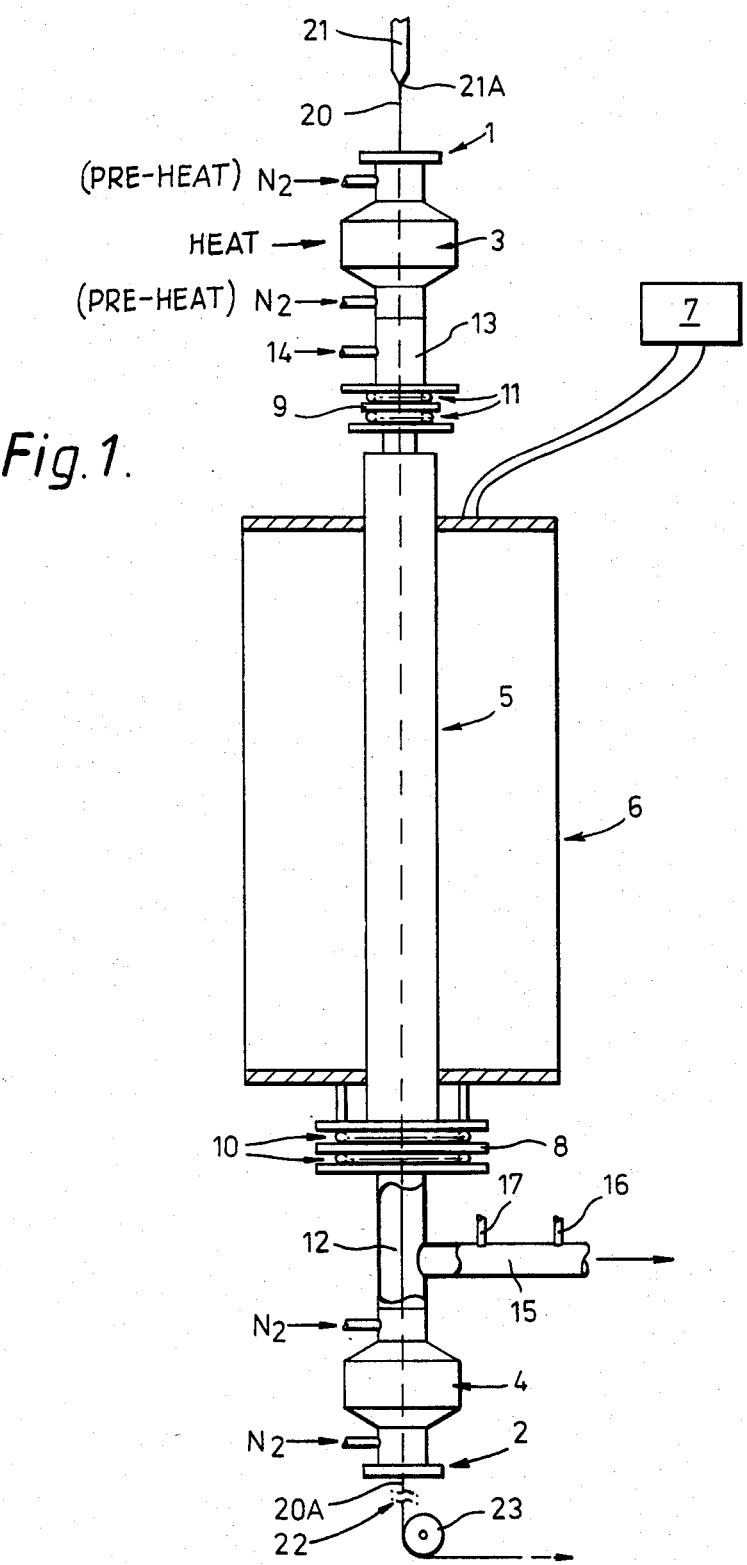
FIG. 1 shows diagrammatically an on-line coating apparatus for optical fibres according to an embodiment of the present invention.

Silicon nitride is established in semiconductor technology where it is used for masks and passivation layers. It is extremely inert and provides an excellent barrier to diffusion. Therefore, a coating of silicon nitride applied immediately next to the fibre surface should prevent or drastically reduce stress corrosion. Within the semiconductor industry a variety of methods have been employed for silicon nitride deposition. The more commonly used methods are listed below.

RF Glow Discharge
RF Sputtering
Vacuum Evaporation
Ion Implantation
Direct Nitridation
Chemical Vapour Deposition.

The two most widely used systems for the pyrolytic production of silicon nitride have been $SiH_4/NH_3$ and $SiCL_4/NH_3$. Silicon tetrachloride is relatively safe to handle but suffers from the problem of reacting with ammonia at room temperature and below to form involatile imides and ammonium chloride which rapidly blocks up exhaust lines and hence causes great problems for continuous deposition. Hence, although more hazardous, silane ($SiH_4$) was considered a much better alternative. Reaction of silane and ammonia with nitrogen as carrier/diluent at $-1000°$ C. produces amorphous coatings of silicon nitride. Addition of a suitable source of oxygen such as $CO_2$, $NO$, $O_2$, produces silicon oxynitride, the exact stoichiometry being determined by the ratio of reactants:

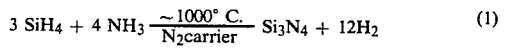

(1)

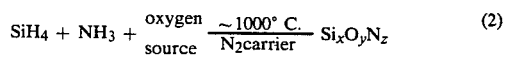

(2)

Silicon oxynitride has been considered along with silicon nitride since the oxynitride is also an excellent diffusion barrier and may well produce a less stressed coating on silica. Film stress can be controlled by varying the values of x,y, and z in Eq. 2.

It should be noted that UV activation of the above reactions is also possible.

Due to the pyrophoric and toxic nature of $SiH_4$ initial experiments were carried out off-line with a sealed system. This off-line work was on the production of $Si_3N_4$ only. The deposition apparatus, in essence, consisted of the following components:

(i) Vapour train
(ii) Furnace
(iii) Reactor.

(i) Vapour Train

Source gases were research/electronic grade with in-line filters. Gas flows were initially controlled by rotary flow meters except for $SiH_4$ which was controlled by mass flow controller. Nitrogen was used both as a carrier/diluent and also as a purge gas for the cylinder regulators, gas lines and reactor. Such purging is very necessary when using pyrophoric materials. Prior to entering the reactor the gas stream was passed through a final in-line filter which induced turbulence and hence ensured thorough mixing of the source gases.

(ii) Furnace

The furnace was constructed by winding Kanthal Al resistance wire onto an alumina tube. The total length of the windings was approximately 500 mm. This was mounted into an aluminium case with sindanyo end plates and insulated with kaowool.

(iii) Reactor

The reactor consisted of a silica tube close fitting within the heated alumina furnace tube. The reactants were passed in at the top of the reactor and waste products were exhausted at the bottom. Extract rate was balanced to match the total reactant flow rate.

Gas Seals

A non-contacting sealing system was proposed to ensure strong fibre at the end of the coating process. In view of the toxic and pyrophoric nature of the reactants used this seal system has to be extremely efficient. A system employing a nitrogen gas seal was devised based on venturi effect air movers (HMC-Brauer Ltd). These create large flows of air by inducing movement of surrounding air. For each seal, two such airmovers were mounted back to back and as such were working in opposition. The aim of this was to direct a uniform flow of nitrogen back towards the entrance/exit ports of the reactor and also into the furnace at the same time creating a relatively 'dead' zone of nitrogen between the two airmovers. In this way it was discovered that an excellent non-contacting seal was formed with no turbulence problems to induce fibre vibration. Using Freon 12 at room temperature to simulate the reactive gases and nitrogen flows for the seals as indicated below, no traces of Freon could be detected at either entrance or exit ports when using a leak detector at a sensitivity equal to that used on vapour trains.

Referring now to the drawing there is shown a schematic view of the system for on-line deposition. The vapour train was a compact design with all source gases controlled by m.f.c. and a nitric oxide line added for silicon oxynitride production.

The apparatus is mounted beneath the drawing furnace on a pulling tower and comprises an input iris 1 and an output iris 2, non-contacting input seal system 3 at the top and non-contacting output seal system 4 at the bottom.

The furnace 5 constructed as described previously surrounds a reactor 6 also constructed as described previously. An electrical power supply 7 is controllable to control the temperature of the furnace and thus the temperature of the reactor. This temperature should lie in the range 700°–1100° C.

The reactor 6 has end flanges 8 and 9 fixed and sealed by O-rings 10 and 11, to an extraction manifold 12 and an inlet manifold 13. The inlet manifold 13 has a reactant inlet 14 and the outlet manifold has an extraction port 15. A bleed opening 16 for $N_2$ bleed into the extraction gases is used to prevent back diffusion of air plus balancing flow for line adjustment of extraction rates. A by pass port 17 from the vapour train is also provided. The nitrogen used for the top and bottom seals and for the balancing of the extract system was controlled by rotary flow meters using piped site gas. A single supply line was fitted for each pair of airmovers which was split to supply equal quantities of gas to each. (If necessary more precise control of the seals could be achieved by supplying each airmover separately).

Initial experiments used conditions in the ranges:
Peak Furnace Wall Temperature = 700°–1100° C.
$SiH_4$ Flow Rate = 10–50 cc/min
$NH_3$ Flow Rate = 800 cc/min NO Flow Rate=zero cc/min
N₂ Flow Rate=5000 cc/min
Typical reactant ratios were SiH₄:NH₃:N₂=1:40:250
Total N₂ flow to top seal system=20 liter/min
Total N₂ flow to bottom seal system=20 liter/min
Top and bottom iris apertures=7 mm
N₂Flow to balance extract=10 liter/min
Fibre draw rate=10-80 m/min An optical fibre 20 drawn from the heated region 21A of a preform 21 enters the iris 1 and passes through the seal 3, reactor chamber 6, seal 4 and exit iris 2, before being drawn around pulley 23 for storage onto a storage drum (not shown). There is also a plastics coating applicator 22 for coating the nitrided fibre 20A.

Figure 2:
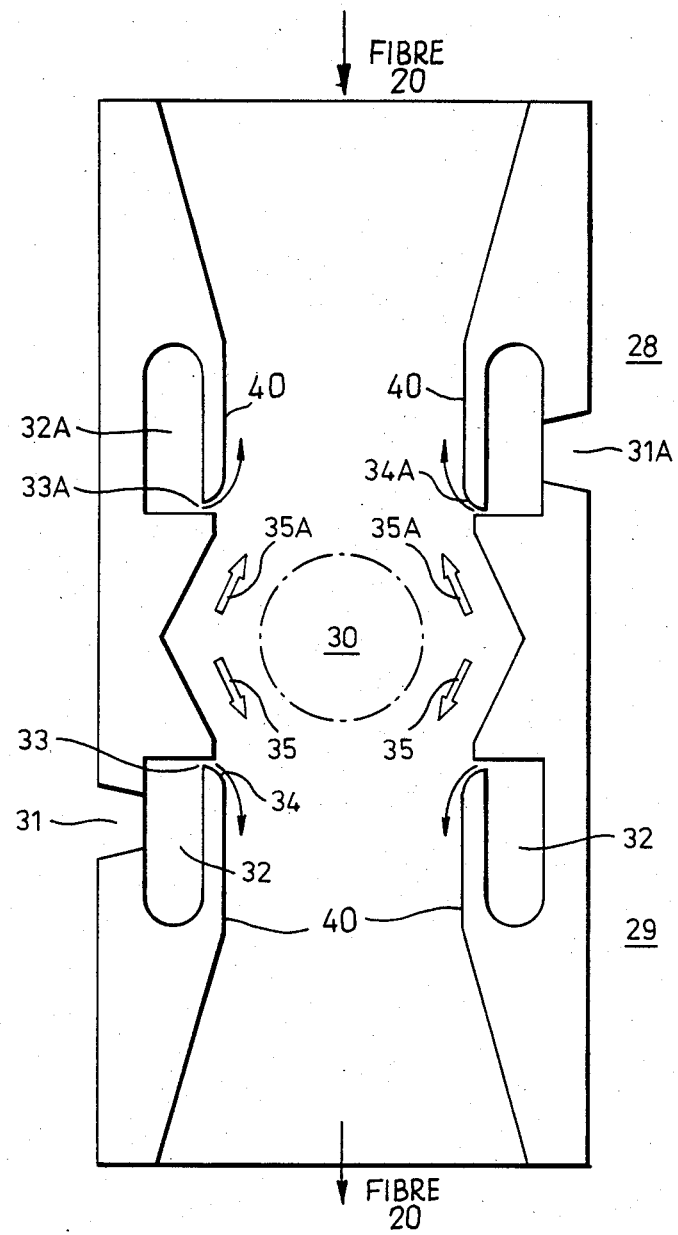
FIG. 2 shows a detail of FIG. 1.

One of the seals 3 and 4 will now be described in detail. The venturi effect devices used to form the seals 3 and 4 were airmovers made by Brauer and the principle is shown in FIG. 2. First and second devices 28 and 29 are mounted back to back so that the combined effect is to produce a dead zone 30 in the centre and common to both airmovers.

Compressed nitrogen flows from the small inlet 31 into an annular chamber 32. The nitrogen is then throttled through the annular gap 33. The thin layer of nitrogen created then adheres to the profile 34 and flows parallel to the axis of the seal. However since the two devices are working in opposition the net result is the dead zone 30 and we have discovered that this creates an effective seal around the optical fibre as the fibre moves through the seal. The diameter of the bore of the seal is about 20 mm but could be in the range of 10-75 mm.

The seal works when no optical fibre is present.

It is proposed to pre-heat the nitrogen sealing gas before it enters the gas seals 3 and 4, and it is further proposed to heat the seals 3 and 4 themselves in order to pre-heat the fibre and thus provide the fibre to the reaction within the reaction chamber at or approaching the required temperature for deposition. This temperature would be of the order of 800° C. for nitride or oxynitride deposition. The fibre as it enters the seal may have fallen to around 100° C. from the temperature of just above 2000° C. when it is drawn from the preform 21,21A. Thus it is proposed to preheat the fibre using the sealing gas and this has been found to significantly enhance the deposition rates achievable.

Clearly the seal has application in other on-line processes for coating as well as reaction deposition but has particular advantage here where toxic and pyrophoric gases like Silane are used in the process. With such gases it is important that all parts of the system, including the regulators, are airfree before introduction of the gas into the system. The regulators on the NO, NH₃ and SiH₄ cylinders are equipped with purge lines. Input gas for this purge is taken from the same N₂ supply as is used for the carrier gas/diluent during actual deposition. After the mixing filter on the vapour train the reactant gas line is taken to a separate manifold at the top of the pulling tower where, by means of a 3-way tap, the gases can either pass through the reactor or be by-passed directly to the extraction system.

Advantages of the Invention

The advantages of the invention are the ability to coat optical fibres on-line with silicon nitride or oxynitride or other materials to provide an hermetic seal on the fibre whilst providing a gas tight seal to the reaction chamber without disturbing and vibrating the fibre, thus minimising the risk of surface flaws in the fibre.

We claim:

1. A method of manufacturing an optical fibre comprising drawing the fibre through an on-line process chamber to physically and/or chemically change the surface of the fibre within the chamber, and sealing the atmosphere within the chamber at least at one end of the chamber by a seal into which a sealing gas is introduced and so controlled as to prevent the process gases escaping from the chamber without the fibre touching the walls of the seal and without vibrating the fibre.

2. A method as claimed in claim 1, wherein silicon nitride is formed on the surface of the fibre by chemical vapour deposition within the reaction chamber.

3. A method as claimed in claim 1, wherein silicon oxynitride is formed on the surface of the fibre by chemical vapour deposition within the reaction chamber.

4. A method as claimed in claim 1, wherein the seal is formed by a pair of venturi-effect airmoving devices mounted back to back and working in opposition to one another.

5. A method as claimed in claim 1, wherein the sealing gas is nitrogen.

6. A method as claimed in claim 1, wherein the fibre has a temperature which falls below a temperature required for said processing, and wherein the fibre is heated prior to entering the processing chamber.

* * * * *